Patented Feb. 12, 1952

2,585,119

UNITED STATES PATENT OFFICE 2,585,119

METHOD OF PREVENTING FOAMING IN TRANSFERRING HOT ASPHALT

Ross A. Hanson, Torrance, and Frederick S. Scott, Los Angeles, Calif., assignors to Union Oil Company of California, Los Angeles, Calif., a corporation of California No Drawing. Application March 12, 1948, Serial No. 14,645

3 Claims. (Cl. 106—273)

This invention relates to the loading and shipment of hot asphalt and more particularly it relates to a method and composition for reducing and/or eliminating the foaming difficulties occasioned during the loading and transfer of hot asphalt into tanks, tank cars and/or trucks which are or may be contaminated with water.

For many years the problem of transferring hot asphalt from storage into tanks, carried on trucks or railroad cars, for shipment to consumer has been a serious problem because of the fact that water is often present in the tanks as a result of cleaning operations, steam leaks, weather, water in previous shipments, and/or other sources. When hot asphalt is discharged into a tank containing water, the mixture generally foams, slowly overflows the tank, and sprays or spills asphalt on the surrounding equipment and personnel. The action of the water to produce the foam is often delayed for several minutes or even an hour until the water is converted into steam at which time the foaming occurs without warning and is therefore extremely hazardous. The cost of the spilled asphalt, as well as the time and labor involved in the clean up of the spilled asphalt, constitutes an appreciable economic loss. The hot asphalt spillage presents a serious fire hazard and in many cases the asphalt flowing over the hot exhaust of the truck has been ignited and a serious fire has resulted.

There is, therefore, a definite and positive need in the industry for an agent which could be added to the hot asphalt during the loading to insure freedom from asphalt spillages caused by the presence of water in the tank.

It is, therefore, an object of this invention to provide a composition and method for reducing and eliminating the foaming of hot asphalt during loading and transfer operations.

It is another object of this invention to eliminate the safety hazards involved in the handling and transport of hot asphalt.

It is another object of this invention to provide a method for loading hot asphalt in conjunction with a composition for reducing the foaming of the hot asphalt caused by contaminating water.

It is a specific object of this invention to provide a particular class of silicones which are effective in preventing the spillage of hot asphalt caused by contaminating water and to provide a method for their use.

Briefly, this invention comprises a method for loading hot asphalt in which a silicone-containing material is added to the asphalt prior to, or during, the loading which materially reduces and/or eliminates the foaming tendencies of the hot asphalt in the presence of contaminating water.

The term "silicones" has been used to define a wide class of polymeric organosilicon compounds which have come into commercial prominence within the past few years.

The basic building units for silicone polymers comprises three types, namely, chain stopping units, chain continuing units, and chain cross-linking units. These units are derived from the hydrolytic products of tri-substituted silicon halides, di-substituted silicon halides and mono-substituted silicon halides respectively. The basic linkage of the silicone compounds involves an alternating linkage between silicon and oxygen atoms wherein the silicon is derived from the silicon halide and the oxygen is entered by replacement of the halogen with a hydroxyl group and subsequent dehydration and condensation among the hydroxyl groups.

Thus, a tri-substituted silicon halide is a monofunctional unit since it has but one silicon-chlorine bond which is replaceable by a single silicon-oxygen bond. The hydrolytic product derived from a tri-substituted silicon halide can only serve to block the end of a silicon-oxygen chain from further chain lengthening reaction. Di-substituted silicon halides are bi-functional in nature since each of the two halogens is replaceable with a hydroxyl group which allows this unit to condense in two directions and, therefore, increase the linear length of a chain repeated condensation until blocked by a monofunctional group mentioned previously. Similarly, the halogens of the mono-substituted silicon halides are replaceable by three hydroxyl groups each of which may then dehydrate in the presence of neighboring hydroxyl groups and condense to form polymers. These polymeric building units are tri-functional in that they permit the simultaneous growth of the polymer in three dimensions. The three directional growth of the polymer results in numerous cross-linkages among the linear chains thereby decreasing mobility of the resultant polymer and increasing its resinous character.

It is apparent that a wide variety of silicone polymers ranging from the simple dimer resulting from the condensation of two mono-functional units, to the purely linear type polymer derived from the cocondensation of a number of bi-functional units and termination with mono-functional units, to the very complex three dimensional polymers derived from the intercondensation of numerous tri-functional units with each other and with both mono and di-functional units. The use of varying mixtures of these three classes of chain building units permits a wide range of polymeric types of silicones to be prepared.

A convenient method for characterizing the polymeric type of a given silicone is the ratio of R/Si which represents the numerical ratio of the number of alkyl and/or aryl groups per atom of silicon. In polymers derived solely from mono-functional units the ratio R/Si is 3, for polymers derived solely from bi-functional groups the ratio is 2, for polymers derived solely from tri-functional units the ratio is 1. Polymers derived from mixtures of mono and poly-functional units have R/Si ratios which are intermediate between the ratios for polymers comprising the pure units. It is apparent, therefore, that the R/Si ratio may be used to characterize the polymeric construction of a particular silicone polymer.

Silicones are prepared by hydrolizing such compounds as mono-alkyl silicon halides, di-alkyl silicon halides, tri-alkyl silicon halides, mono-aryl silicon halides, di-aryl silicon halides and tri-aryl silicon halides. The alkyl and aryl silicon halides are readily prepared from the appropriate silicon halides and Grignard reagents.

The hydrolysis of the substituted silicon halides is carried out by treatment with water at any suitable temperature and pressure commensurate with the vigor of the reaction. In general, the hydrolysis is carried out slowly and in a controlled fashion until the average molecular weight of the polymer is in the desired molecular weight range. At this point further addition of water is stopped and an excess of a tri-substituted silicon halide, such as tri-methyl silicon chloride, is added. The addition of further water causes the tri-substituted silicon chloride to condense on the ends of the polymeric chain thereby stopping any further growth of the chain. The hydrolysis is sometimes carried out by first treating the substituted halides with an alcohol such as methyl or ethyl in order to form an intermediate ester which is subsequently hydrolyzed and condensed to the silicone polymer by treatment with water. This method is sometimes used to control the vigor of the reaction.

Another method for the preparation of silicones is the so-called "equilibrating" method in which simple polymers or mixtures of polymers are treated with a catalyst, such as sulfuric acid, with the result that new polymers are formed, the structure and molecular weight of which depend upon the relative concentrations of combined building units present in the original polymer feed stocks. This method of silicone synthesis is described in "Chemistry of the Silicones" by Rochow (1946) on page 66.

It has been found that those silicones which have saturated aliphatic radicals attached to the silicon atom and contain from 1 to 3 carbon atoms are especially useful in the application of this invention. These radicals include methyl, ethyl, propyl, isopropyl, and/or mixtures of these. Those silicones which are substantially linear or near linear are preferred to those silicones which are predominantly cyclic in nature and/or highly cross-linked. Those silicones which contain an average of more than 15 silicon atoms per molecule may be used while those silicones containing between 15 and 40 silicon atoms per molecule are preferred. Although saturated aliphatic side chains attached to the silicon atom may be any of the afore-mentioned radicals having between 1 and 3 carbon atoms, it has been found that those radicals having 1 or 2 carbon atoms are most effective, namely, methyl and ethyl. In the event that mixed radicals are to be employed it is preferred that at least 80% of the radicals be methyl and/or ethyl and that the remainder have 3 carbon atoms.

It is desirable to use those silicone polymers having an average of more than 15 silicon atoms per molecule and also having an R/Si ratio of between 1.6 and 2.0. It is preferable, however, to use those polymers which have an R/Si ratio of between 1.8 and 2.0.

Silicones are extremely effective for reducing the foaming of the asphalt in the presence of contaminating water even though the silicone is present in high dilution. Thus, concentrations of silicones in the range of 0.000001 to 0.01% by weight based on the loaded tank of asphalt are effective and may be used. Concentrations in the range of 0.00001 to 0.001% by weight are preferred however.

Perhaps the application of this invention can best be understood by reference to the following specific examples:

*Example I*

A methyl silicone polymer having an R/Si ratio of about 1.95 and having an average molecular construction corresponding to about 25 silicon atoms per molecule is prepared by conventional polymerization methods from a mixture of di-methyl silicon chloride and mono-methyl silicon chloride. A chain terminating reaction using tri-methyl silicon chloride is employed to restrict further chain growth after the above conditions are approached.

About 5 pounds of the above polymer are dissolved in 2 gallons of domestic diesel fuel at 150° F. obtained from the distillation of a straight run California paraffinic crude and having a boiling range of about 350 to 525° F. The solution containing the methyl silicone is then added to 9 additional barrels of the diesel fuel at a temperature of 150° F. whereupon the silicone polymer is completely dissolved in the diesel oil solvent.

In loading tank cars of about 10,000 gallons capacity with asphalt at 400° F., the tank is filled to about ⅓ full without difficulty from the presence of any contaminating water. The loading of the asphalt is continued while about 2 to 8 quarts of the above solution is added with the asphalt stream in such a way as to take advantage of the turbulence of the incoming asphalt stream to disperse the solution throughout the contents of the partially filled tank. The final loading of the tank car is then completed without difficulty.

In loading tank trucks of 1,000 to 5,000 gallons capacity, the same procedure is followed with the exception that only 1 quart of solution is used.

*Example II*

When Example I is repeated using an ethyl silicone polymer having an R/Si ratio of 1.75 and an average of about 40 silicon atoms per molecule, the same freedom from foaming is obtained.

In each of the specific examples described above the silicone has been dissolved in an intermediate petroleum fraction prior to its addition to the asphalt. Although the silicones may be employed in the absence of a solvent, the preliminary dispersion of the silicone in an intermediate boiling range petroleum fraction, such as kerosene, diesel fuel, light lubricating oil and the like, has the very important advantage of rapid and easy dispersion of a small amount of silicone in a large volume of hot asphalt.

It is apparent that this invention comprises a means for handling hot asphalt wherein substantially complete freedom from foaming asphalt is obtained even though the hot asphalt at about 400° F. is discharged into a vessel containing an appreciable amount of water. Although it is usually most convenient to add the foam suppressing solution during the loading of the hot asphalt and when the tank is approximately ⅓ full as described in Example I, the exact time of addition is not too critical provided that it is added and dispersed in the asphalt prior to the danger of a foam-over. The purpose of adding the foam suppresser when the tank is about ⅓ full is to take maximum advantage of the turbulence of the asphalt during the loading in order to disperse the foam suppresser throughout the asphalt.

Having fully illustrated and described the principles of our invention we wish to claim the following:

1. A method for transferring hot asphalt from a storage tank to a cold shipping tank of the group consisting of tank cars and tank trucks, wherein said asphalt in said storage tank is substantially anhydrous and wherein said shipping tank contains small amounts of extraneous water, which method comprises maintaining said asphalt in said storage tank in a liquid state by establishing and maintaining a temperature of about 400 F., flowing said asphalt from said storage tank to said shipping tank until said shipping tank is filled to between about one-quarter and one-half of its capacity, thereupon adding small amount of a dispersion of a silicone in a hydrocarbon oil to said shipping tank and thereby forming an overall mixture which contains between about 0.000001 and 0.01 per cent by weight of said silicone, maintaining an open vent in the roof of said shipping tank to permit the escape of steam, and continuing to flow said asphalt from said storage tank to said shipping tank with relative freedom from asphalt spillage caused by the sudden vaporization of said extraneous water in said shipping tank and wherein said silicone is an alkyl silicone having alkyl groups selected from the class consisting of saturated aliphatic radicals having one, two and three carbon atoms and wherein said silicone contains an average of between 15 and 40 silicon atoms per molecule and wherein said silicone has an R/Si ratio of between about 1.6 and 2.0.

2. A method according to claim 1 wherein said silicone is a methyl silicone.

3. A method according to claim 1 wherein said silicone has an R/Si ratio between about 1.8 and 2.0.

ROSS A. HANSON.
FREDERICK S. SCOTT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,322,629 | Goodwin | June 22, 1943 |
| 2,375,007 | Larsen et al. | May 1, 1945 |
| 2,406,671 | Diamond | Aug. 27, 1946 |
| 2,416,504 | Trautman et al. | Feb. 25, 1947 |
| 2,435,124 | Bollinger | Jan. 27, 1948 |
| 2,451,362 | Snyder | Oct. 12, 1948 |

OTHER REFERENCES

Oil & Gas Journal, October 6, 1945, pp. 86–88, 112 and 113. (Copy in Scientific Lib.)